Nov. 1, 1938. V. H. CORNELL 2,134,704
FIELD PHOTOSTATING APPARATUS
Filed Nov. 5, 1936 2 Sheets-Sheet 1

Inventor
Virgil H. Cornell.
By Adam Richmond
Attorney

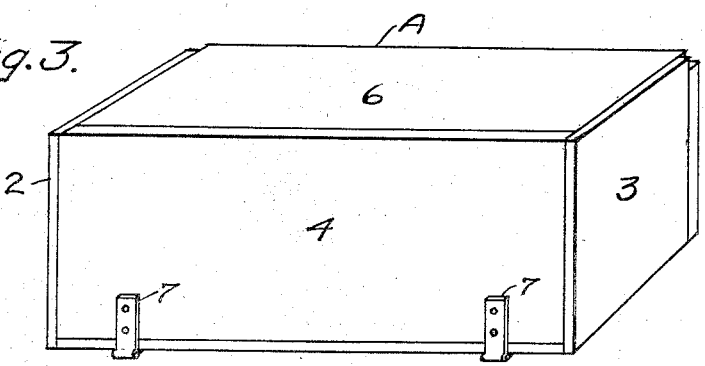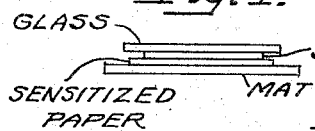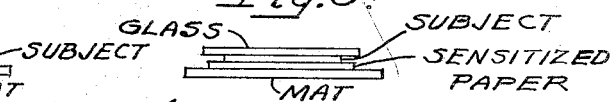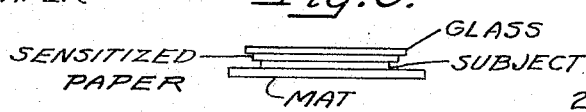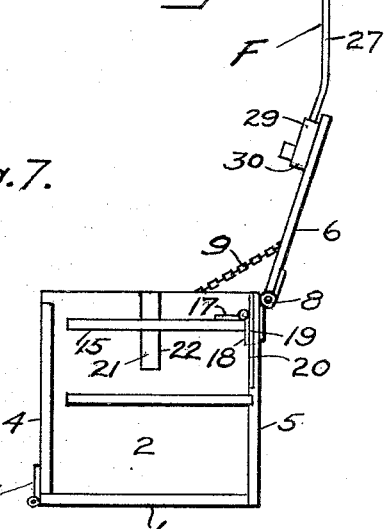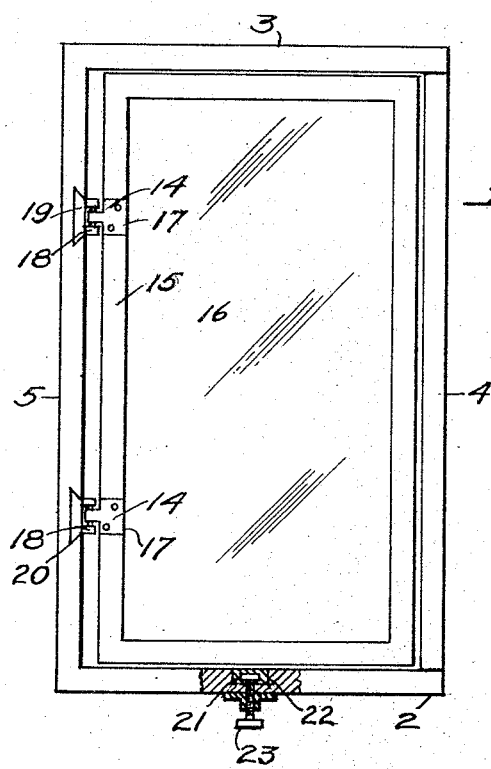

Patented Nov. 1, 1938

2,134,704

UNITED STATES PATENT OFFICE 2,134,704

FIELD PHOTOSTATING APPARATUS

Virgil H. Cornell, New York, N. Y.

Application November 5, 1936, Serial No. 109,335

5 Claims. (Cl. 95—73)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to photography and more especially it is directed to a photostating kit for field service by means of which field notes, drawings, maps and the like, may be readily reproduced in the form of positive and negative photostats without the elaborate photostat equipment heretofore required for this purpose.

One object of this invention is to provide a field photostating kit which is compact, easily transported and which combines in a single cabinet, a suitable exposure unit, compartments below the unit for the accommodation of photographic supplies and a lighting arrangement detachably mounted above the unit for exposure purposes.

Another object of this invention is to provide a photostating field kit comprising a cabinet containing an exposure unit including a glass panel hingedly mounted above a yieldable platen, the glass panel being vertically adjustable relative to the platen and capable of being fixed in adjusted position, whereby when the subject to be reproduced and a sheet of sensitized paper are arranged in proper printing relation and positioned between the yieldable platen and the glass panel, a firm uniform pressure will be exerted upon the sensitized sheet and subject throughout the exposure period to establish the contact requisite to a clear non-blurred print.

Other objects of this invention are: to provide a photostating field kit including an exposure unit which will afford the necessary contact between the subject to be reproduced and the sensitized paper regardless of the form of the subject, that is to say, whether it is a single sheet or a page to be copied from a book; to provide a photostating field kit wherein the top of the cabinet when in elevated position functions as a holder for a light bracket which is adapted to support a lamp of the requisite candle power at a proper elevation above the exposure unit and to furnish a kit which is sturdy, inexpensive to produce and composed of relatively few parts.

Briefly stated, this invention comprises a cabinet having a hinged top and a drop front section adapted to give access to the interior of the cabinet from the front and top, an exposure unit mounted in the upper portion of the cabinet and including a yieldable sponge rubber platen and a glass panel overlying and adjustable relative to the platen, a compartment beneath the exposure unit formed by a portion of the latter, a light bracket adapted to be connected to the top of the cabinet and an incandescent lamp carried by the bracket and supported at a suitable height above and central of the glass panel of the exposure unit.

Referring more particularly to the accompanying drawings, in which corresponding parts are indicated by similar reference characters:

Fig. 3 is a perspective view showing the photostat kit closed and in readiness for transportation;

Fig. 4 is a diagrammatic detail illustrating the arrangement of subject and sensitized paper in the exposure unit when a negative photostat is to be produced by the direct method of contact printing;

Fig. 5 is a similar view with the subject and sensitized paper arranged to produce a reverse mirror image negative by the direct method of contact printing;

Fig. 6 is a similar view with the subject and sensitized paper arranged to produce a negative photostat, reverse mirror image by the indirect method of contact printing;

Fig. 7 is a top plan view of the cabinet with the top section removed; and

Fig. 8 is a transverse section, partly in elevation illustrating the cabinet with its top in elevated position and the light bracket and lamp operatively mounted for exposure purposes.

Figure 1:
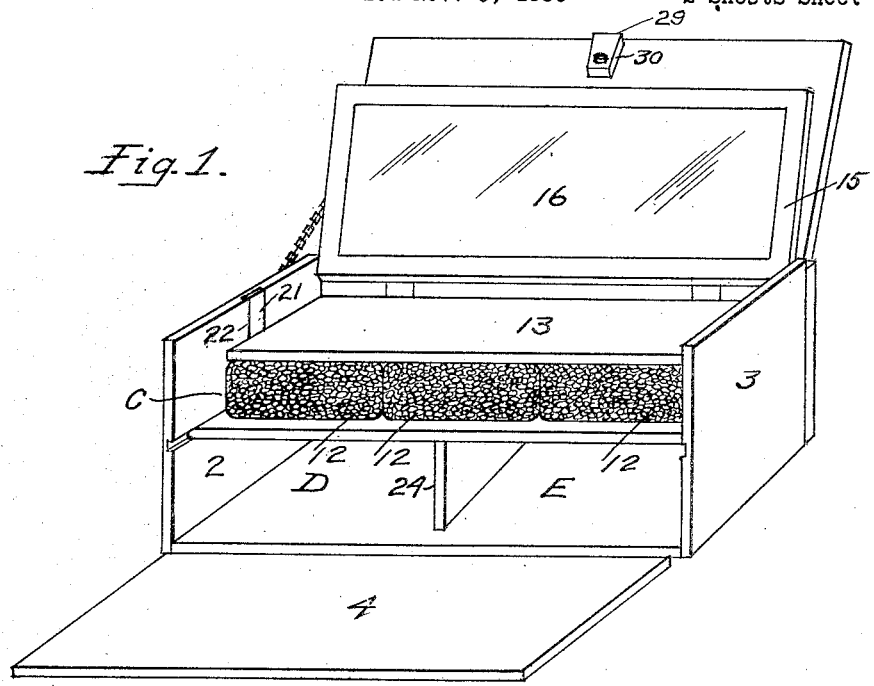
Fig. 1 is a perspective view of the photostat kit forming the subject matter of this application, the kit being shown with its top section, glass panel and front section in open position.

The present invention was developed for the purpose of providing an inexpensive assembly to be used in the field for obtaining positive and negative photostats by either the direct or indirect methods of contact printing. Contact printing by the direct method refers to the manner of printing wherein the copy obtained is a direct print of the subject with blacks and whites reversed. A reproduction by this method is made by placing the sensitized (emulsion) surface of the photograph paper in contact with the plain (back) side of the subject and exposing the photographic paper by passing light through the subject. This method, however, cannot be used if the subject is printed on both sides of the paper.

The indirect method of contact printing refers to the manner of printing wherein the copy obtained is a reverse print of the subject. This print may be used as a paper negative to print a final copy which is direct with blacks and whites the same as the original subject. The indirect method must be used whenever the subject is printed on both sides. In the indirect method the photographic paper is exposed by the light passing through it and being reflected from the subject. With either of these methods and the instant kit, excellent copies may be obtained of letters, the pages of a book (without removing the pages), half-tone photographs and the like, at normal expense and with no photographic equipment other than that provided by the kit.

Coming now to the structural details of the invention under consideration, A indicates a rectangular cabinet, having a bottom section 1, end sections 2 and 3, front and rear sections 4 and 5 and a top section 6. Front section 4 and top section 6 are hinged as at 7 and 8 to give access to the interior of the cabinet from its top and front, as clearly shown in Figs. 1 and 2 of the drawings. A bracket or chain interconnecting the top and end sections 2 as at 9, limits the rearward movement of the top to hold it at a proper elevation for the light bracket hereinafter to be referred to.

Figure 2:
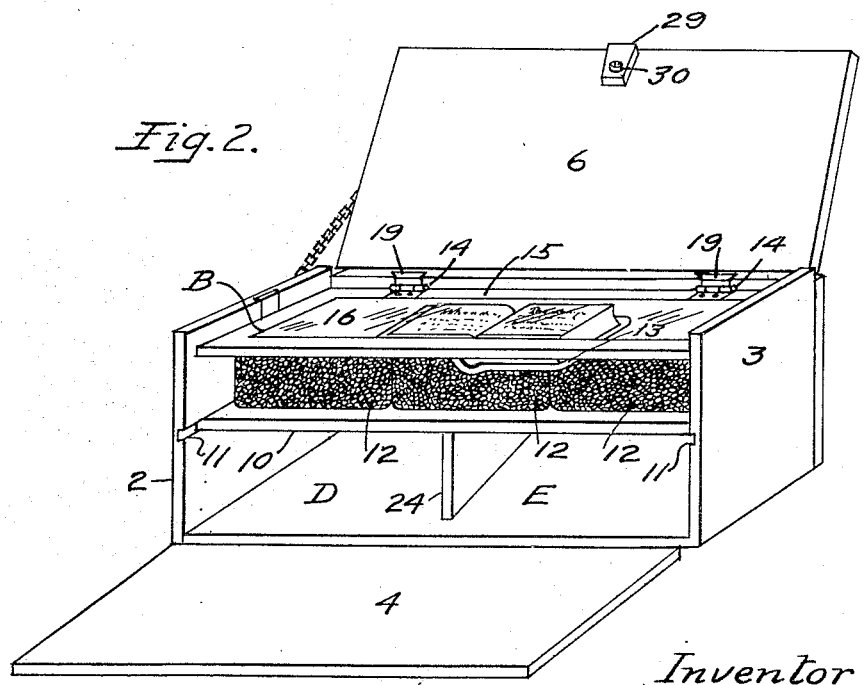
Fig. 2 is a perspective view showing the top and front sections in open position and illustrating the arrangement of a book in the exposure unit when one of its pages is to be reproduced.

An exposure unit B is disposed in the upper portion of the cabinet, as clearly shown in Figs. 1 and 2 of the drawings. Unit B consists of a horizontally disposed partition 10 slidably mounted in grooves 11 which are formed in the inner surfaces of end sections 2 and 3. Partition 10 divides the cabinet into upper and lower portions and likewise constitutes a support for the sponge rubber sections 12 and felt mat 13 overlying the rubber sections as shown in Figs. 1 and 2 of the drawings. This assembly of partition 10, sponge rubber sections 12 and mat 13 constitute what will hereinafter be referred to as platen C of the exposure unit B.

Attached to the rear section 5 of the cabinet immediately above the platen C by means of hinges 14, is a glass frame 15 adapted to support a glass panel 16. To enable the glass frame 15 to be vertically adjusted with respect to the platen C, each of the hinges 14 is formed in two parts 17 and 18, one part 17 being connected to the glass frame 15, the other 18 to a slide 19 adjustable in channel 20, which is formed in the inner surface of rear section 5 of the cabinet, as clearly shown in Figs. 7 and 8 of the drawings.

To effect lateral movement of glass frame 15 so that one end of the frame may be forced into frictional contact with end section 3 of the cabinet, the construction of hinges 14 is such as to allow a slight lateral movement of hinge part 17 relative to hinge part 18, as shown in Fig. 7 of the drawings. By virtue of this movement frame 15 may be frictionally secured in position after it has been vertically adjusted with respect to platen C. Glass frame 15 is laterally actuated by means of a bearing block 21 which is adapted to engage one end of the frame as shown in Fig. 7 of the drawings. Bearing block 21 is normally housed in a recess 22 formed in end section 2 of the cabinet and is mounted on the inner end of a set screw 23. With this arrangement, manipulation of the set screw will displace block 21 and force the glass frame laterally in binding engagement with end section 3 of the cabinet, as will be understood without further discussion.

To accommodate the light bracket, hereinafter to be referred to, as well as the requisite photographic supplies, such as photostat paper, chemicals, developing trays and the like, the lower portion of cabinet A is formed into two compartments D and E, by a centrally arranged transversely extending partition 24, as clearly shown in Figs. 1 and 2 of the drawings.

To provide an artificial light source for exposure purposes, an incandescent lamp 25 of suitable wattage is mounted centrally of and approximately 6 feet above the exposure unit B. This lamp 25 is carried by a light bracket F composed of horizontally and vertically disposed hinged sections 26 and 27, the free end of hinge section 27 being formed with a wedge shaped plug 29 adapted to fit into a similarly shaped socket-block 30, affixed to the top section 6 of the cabinet at a point adjacent its upper longitudinal edge and midway between its lateral edges as clearly shown in Fig. 8 of the drawings.

Block 29 and socket block 30 are adapted to be equipped with suitable electrical contacts (not shown) for establishing an electrical circuit to the lamp. Light bracket F, when not in use, is folded and housed in either compartment D or E of the cabinet as will be understood without further discussion.

Having outlined the structural features of this invention, its use in the field will now be described.

Assuming the photostat kit to be in a suitably darkened inclosure lighted only by a ruby lamp, the cabinet A and exposure unit B arranged as shown in Fig. 1, and light bracket F and its lamp in operative position, as shown in Fig. 8; to reproduce a subject (and by subject is meant, letter printed pages, halftone, photograph, map drawing or other matter to be reproduced) on photostat or similar paper by the direct method of contact printing, to obtain white characters on a black background, the procedure is as follows:

A sheet of photostat paper of the required size is laid upon the yieldable surface of platen C, with its sensitized surface uppermost and upon the sensitized surface of the photostat paper, the subject is placed with its impression surface uppermost. The work being thus arranged, glass frame 15 of exposure unit B is lowered upon the work and platen and pressed into the yieldable surface of the platen C, until uniform contact is established between the subject and the underlying sheet of photographic paper, whereupon the frame is locked and the work is ready for exposure. Incandescent lamp 25 is now flashed on and off to provide an exposure period of from one to two seconds, after which the photographic paper is removed from the exposure unit, developed, washed, fixed and dried in the usual manner. The resulting print is a true copy of the original with white letters on a black background.

In the event it is desired to reproduce a subject by the direct method of contact printing so as to obtain a photostat with black characters on a white background, in other words, a positive, the procedure is slightly different from that hereinabove described, in that a reverse (mirror image) negative must first be made and this negative used in place of the original subject to produce the final positive copy, for instance, a sheet of photostat paper of the required size is laid on the platen C, with its sensitized surface uppermost, and upon this paper the subject is placed with its impression surface down, that is to say, against the sensitized surface of the photographic paper. From this point on, the procedure is the same as that previously outlined in connection with the production of a negative photostat. The resulting print is a reversed negative.

In order to secure the required positive copy, the reverse negative is arranged in the exposure unit with its printed surface down, that is to say, overlying the sensitized surface of a sheet of photostat paper, whereupon it is exposed, developed, washed and fixed in the usual manner, the resulting print will be a true copy of the original having black letters on a white background.

To reproduce a subject having printed matter on both sides of the sheet, such as a page from a book, the direct method of contact printing cannot be employed, as both sides of the subject would be printed, consequently the print must be made by the indirect method of contact printing and by means of a paper negative, for example, supposing it is desirable to reproduce a page from a book, so as to obtain a copy having black characters on a white background, in other words, a positive photostat, the procedure is as follows: place the book, opened at the page to be copied, upon platen C of the exposure unit and upon the exposed page lay a sheet of photostat paper, sensitive surface down, lower the frame 15 of the exposure unit until its glass panel 16 rests upon the book, then depress the frame vertically until the book has been embedded into the surface of the platen C sufficiently to establish a uniform contact between the photostat paper and the subject to be reproduced, and then secure the frame in this position for the exposure. Incandescent lamp 25 is flashed on and off to give the required exposure, the photostat paper is removed from the exposure unit and developed, washed, fixed and dried. The resulting print will be a reverse (mirror image) negative.

To produce the final copy with black characters on a white background, the reverse negative is used instead of the original, but in this case the photostat paper with sensitized surface uppermost is placed on the platen and on top of the paper is arranged the reverse negative with its printed surface down. The resulting print will be a true copy of the original in black characters on a white background.

In conclusion, it will be evident, this invention provides a simple, inexpensive apparatus by means of which a subject may be readily photostated, either in negative or positive, without elaborate or expensive equipment and with little knowledge of photography other than that possessed by an amateur photographer who develops and prints his own pictures.

Although in the foregoing, various elements have been defined as best adapted to perform the functions allotted to them, nevertheless it is to be understood that various minor changes may be resorted to within the scope of the appended claims, such as utilizing an overhead incandescent lamp instead of the detachable light bracket shown and described, without departing from or sacrificing any of the principles of this invention.

Having described my invention, what I claim as new and wish to secure by Letters Patent is:

1. A field photostating kit comprising a casing including a rear wall, a cover hinged to the latter adjacent its upper edge and an exposure unit within the casing, said unit comprising a horizontally disposed platen including a sponge rubber mat adapted to yieldably support a subject and a sensitized element in reproducing relation, a glass paneled presser frame hingedly attached to the rear wall adjacent its upper edge, and adapted to overlie said mat, means in connection with the rear wall and the hinged connection of said presser frame to permit said frame to be adjusted vertically with respect to the underlying mat, to imbed the subject in the mat whereby to utilize the resistance of the presser frame and the resiliency of the rubber to establish an intimate contact between the subject and the sensitized element during the exposure period, and means in connection with the presser frame and casing for securing the frame in adjusted position.

2. A field photostating kit comprising a casing including a rear wall, a cover hinged to the latter adjacent its upper edge and an exposure unit within the casing, said unit comprising a horizontally disposed platen including a sponge rubber mat adapted to yieldably support a subject and a sensitized element in reproducing relation, a glass paneled presser frame hingedly attached to the rear wall adjacent its upper edge and adapted to overlie said mat, means in connection with the rear wall and the hinged connection of said presser frame to permit said frame to be adjusted vertically with respect to the underlying mat, to imbed the subject in the mat whereby to utilize the resistance of the presser frame and the resiliency of the rubber to establish an intimate contact between the subject and the sensitized element during the exposure period, means in connection with the presser frame and casing for securing the frame in adjusted position, a light fixture assembly and means carried by said cover adjacent to and centrally of its outer edge and coacting with the light fixture assembly to effect a quick detachable connection between said assembly and the casing.

3. A field photostating kit comprising a casing including a bottom, end and rear walls, a front wall and a cover hingedly attached to said bottom and to said rear wall respectively, a horizontally disposed partition within the casing to divide the latter into superimposed exposure and storage compartments adapted to be exposed by said front wall and cover, an exposure unit within the exposure compartment, said unit comprising a horizontal platen including a sponge rubber mat adapted to support a subject and a sensitized element in reproducing relation, a glass paneled presser frame hingedly attached to the casing and adapted to overlie said mat, means in connection with said rear wall and the hinged connection of said presser frame to permit the latter to be adjusted vertically with respect to the underlying mat, whereby to imbed the subject in the mat and to utilize the resiliency of the rubber and the resistance of the presser frame to establish an intimate contact between subject and sensitized element during the exposure period and means in connection with the presser frame and casing to secure the presser frame in its adjusted position.

4. A field photostating kit comprising a casing including a bottom, end and rear walls, a front wall and a cover hingedly attached to the bottom and to the rear wall respectively and operable to expose the interior of the casing from its front and top, an exposure unit within the casing, said unit comprising a horizontally disposed platen including a sponge rubber mat adapted to support a subject and a sensitized element in reproducing relation, a pair of supporting members vertically mounted in said rear wall, complemental supporting members pivotally connected to and laterally adjustable relative to the first mentioned supporting members, a glass paneled presser frame carried by the complemental supporting members whereby to permit vertical movement of said frame relative to the platen to imbed the subject in the sponge rubber mat, and establish intimate contact between the subject and the sensitized element during the exposure period, and a manually controlled friction device mounted in one of the end walls of said casing and operable to engage and laterally actuate the presser frame into binding engagement with the remaining end wall whereby to retain said frame in its adjusted position.

5. A field photostating kit comprising a casing including bottom, end and rear walls, a front wall and a cover hingedly attached to the bottom and to the rear wall respectively and operable to expose the interior of the casing from its front and top, an exposure unit within the casing, said unit comprising a horizontal platen including a sponge rubber mat adapted to support a subject and a sensitized element in reproducing relation, a pair of supporting members slidably mounted in said rear wall, complemental supporting members pivotally connected to and laterally adjustable relative to the first mentioned supporting members, a glass paneled presser frame carried by the complemental supporting members whereby to permit vertical adjustment of the presser frame relative to the platen to imbed the subject in the sponge rubber mat, to establish intimate contact between the subject and sensitized element during the exposure period and a manually controlled friction device mounted in one of the end walls of said casing and operable to engage and laterally actuate the presser frame into binding engagement with the remaining end wall whereby to retain said frame in its adjusted position, a light fixture assembly and means carried by said cover adjacent to and centrally of its outer edge to effect a quick detachable connection between said assembly and the casing.

VIRGIL H. CORNELL.